(12) United States Patent
Ishida et al.

(10) Patent No.: US 7,337,814 B2
(45) Date of Patent: Mar. 4, 2008

(54) RUNFLAT TIRE SYSTEM AND SUPPORT RING THEREFOR

(75) Inventors: Takaaki Ishida, Kobe (JP); Yurie Tanami, Kobe (JP); Yasuhiro Kubota, Kobe (JP); Masatoshi Tanaka, Kobe (JP)

(73) Assignee: Sumitomo Rubber Industries, Ltd., Kobe-shi, Hyogo-Ken (JP)

( * ) Notice: Subject to any disclaimer, the term of this patent is extended or adjusted under 35 U.S.C. 154(b) by 0 days.

(21) Appl. No.: 11/355,994

(22) Filed: Feb. 17, 2006

(65) Prior Publication Data

US 2006/0196588 A1 Sep. 7, 2006

(30) Foreign Application Priority Data

Mar. 3, 2005 (JP) .............................. 2005-059307

(51) Int. Cl.
*B60C 17/04* (2006.01)
*B60C 5/00* (2006.01)
*B60C 19/00* (2006.01)

(52) U.S. Cl. ...................................... 152/158; 152/520
(58) Field of Classification Search ................ 152/158, 152/520
See application file for complete search history.

(56) References Cited

U.S. PATENT DOCUMENTS 6,516,849 B2 * 2/2003 Flament et al. ......... 152/520 X

2002/0104600 A1 8/2002 Flament et al.
2003/0188817 A1 10/2003 Yukawa et al.

FOREIGN PATENT DOCUMENTS

| DE | 197 50 229 A1 | 6/1999 |
|----|---|---|
| EP | 1 582 379 A1 | 10/2005 |
| JP | 3-252003 A | 11/1991 |
| JP | 2002178727 A * | 6/2002 |
| JP | 2003-502200 A | 1/2003 |
| JP | 2003-285607 A | 10/2003 |
| JP | 2005-7928 A | 1/2005 |
| WO | WO-00/76791 A1 | 12/2000 |
| WO | WO-01/23195 A1 | 4/2001 |

* cited by examiner

Primary Examiner—Adrienne C. Johnstone
(74) Attorney, Agent, or Firm—Birch, Stewart, Kolasch & Birch, LLP (57) ABSTRACT

A runflat tire system comprises a pneumatic tire, a wheel rim on which the pneumatic tire is mounted, and a support ring made of an elastic material and disposed in a cavity surrounded by an inner surface of the rim and an inner surface of the tire mounted thereon, wherein the support ring comprises an annular body extending in a circumferential direction of the tire and being provided with a plurality of recesses each opening at the cavity, and at least two sound reflectors each being attached to the recess and including an outer surface made of a non-porous material so as to reflect sound in the cavity.

8 Claims, 9 Drawing Sheets

PRIOR ART

FIG.11(B)

PRIOR ART

RUNFLAT TIRE SYSTEM AND SUPPORT RING THEREFOR

BACKGROUND OF THE INVENTION

1. Field of the Invention

The present invention relates to a runflat tire system which allows a vehicle to run safely at a constant speed through a predetermined distance even when an internal pressure of a tire is lowered.

2. Description of the Related Art

In recent years, a runflat tire system by which, even if the tire goes flat, it is possible to travel for a very long distance for example several hundred kilometers at a relatively high speed of up to about 80 km/hr has been proposed.

Figure 10:
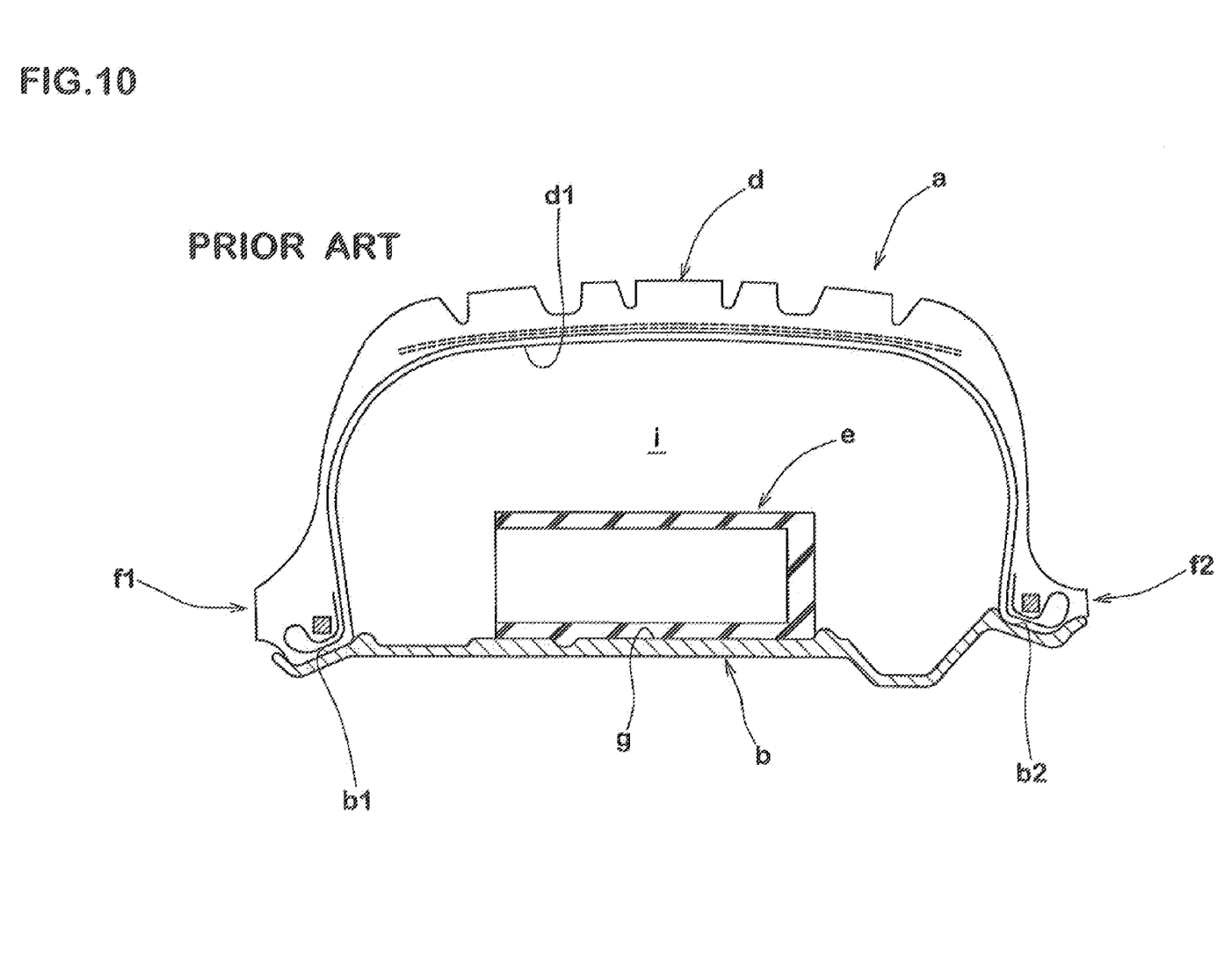
FIG. 10 is a sectional view of a conventional run flat system.

FIG. 10 shows a conventional system of this kind. The system comprises a tire "a", a wheel rim b on which the tire "a" is mounted, and a support ring e mounted on the wheel rim b in a cavity "i" surrounded by the tire "a" and the wheel rim b. When an internal pressure of the tire is reduced, the support ring e contacts against an inner surface of a tread portion d to support a load of the tire. The wheel rim b comprises first and second seats b1 and b2 on which first and second bead portions f1 and f2 of the tire "a" are mounted. A mounting part g for the support ring e is provided between the seats b1 and b2.

In this system, when the internal pressure of the tire "a" is reduced due to puncture or the like, the inner surface d1 of the tread portion d contacts against the support ring e. A load applied to the tire "a" is supported by the support ring e and the wheel rim b. Since the first bead portion f1 and the second bead portion f2 are locked between a rim flange and a hump h, the vehicle can run at such speed that no problem is caused in a runflat manner. This system eliminates a need for exchanging tires on a road shoulder, and allows the vehicle to move to a gas station or a service garage. Thus, it is desired that the runflat tires become widespread in terms of safety at the time of high speed running in addition to convenience and comfort.

As noises generated by a tire, there is a road noise. The road noise is generated if air resonates in the cavity i when a vehicle runs on a rough road, and the road noise causes a roaring sound in a frequency range of about 50 to 400 HZ. The road noise is transmitted into a passenger room and becomes a muffled sound, and this offends a passenger in the vehicle. Like general tires, it is important to reduce the road noise for improving habitability also in the runflat tire system.

Figure 11A:
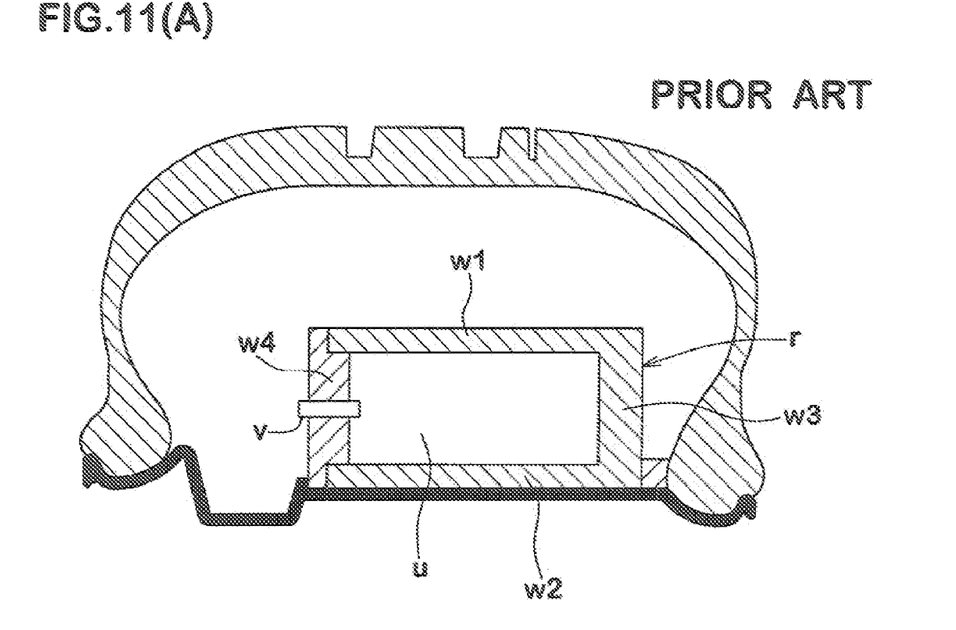
FIG. 11(A) is a sectional view of another conventional system.
Figure 11B:
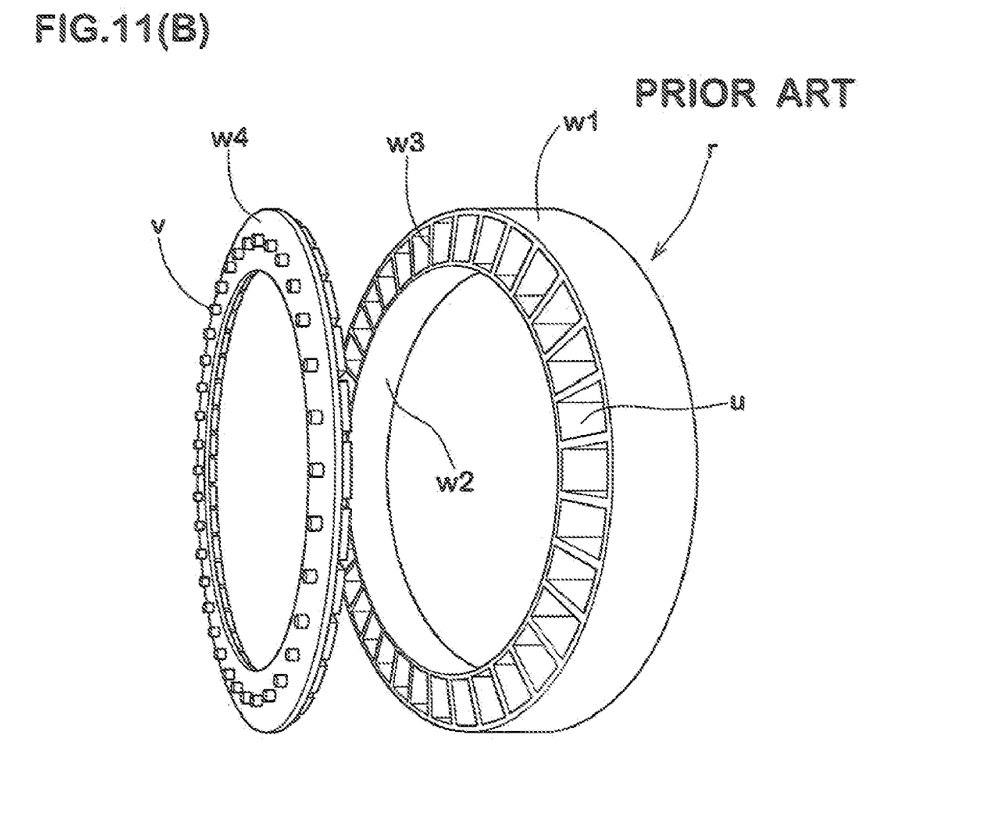
FIG. 11(B) is an exploded perspective view of a conventional support ring.

As shown in FIGS. 11(A) and 11(B), Japanese Patent Application publication No. 2003-502200 (WO 00/76791 A1) proposes a runflat system in which an annular supporting body r mounted on a rim forms a resonator comprising a large number of cavities u defined by supporting wall portions w3 between an outer peripheral wall w1 and an inner peripheral wall w2, and a side plate w4 closes the resonator. The side plate 4 is provided with tubes v which are in communication with the cavities. In this proposal, vibration characteristics of the resonator is optimized by the tubes v based on the principle of the Helmholtz resonator, thereby suppressing the resonance.

According to the former system has a problem that since the side plate w4 is heavy, the entire weight is increased. Further, this system requires complicated and severe operations such as mounting operation of the tubes v on the side plate w4, mounting operation of the cavities on the sidewall w4, and tuning operation of the vibration characteristics of the resonator, so that it takes a lot of trouble to assemble.

SUMMARY OF THE INVENTION

It is a main object of the present invention to provide a runflat tire system which reduces road noise by suppressing the resonance in the cavity, and which is light in weight and has excellent runflat endurance, and to provide a support ring used for the runflat tire system.

According to the present invention, a runflat tire system comprises a pneumatic tire, a wheel rim on which the pneumatic tire is mounted, and a support ring made of an elastic material and disposed in a cavity surrounded by an inner surface of the rim and an inner surface of the tire mounted thereon, wherein the support ring comprises an annular body extending in a circumferential direction of the tire and being provided with a plurality of recesses each opening at the cavity, and at least two sound reflectors each being attached to the recess and including an outer surface made of a non-porous material so as to reflect sound in the cavity.

Also, according to the present invention, a support ring for runflat tire system comprises an annular body extending in a circumferential direction of the tire and being provided with a plurality of recesses opening at the cavity, and at least two sound reflectors each being attached to the recess and including an outer surface made of a non-porous material so as to reflect sound in the cavity.

DESCRIPTION OF THE PREFERRED EMBODIMENTS

Figure 1:
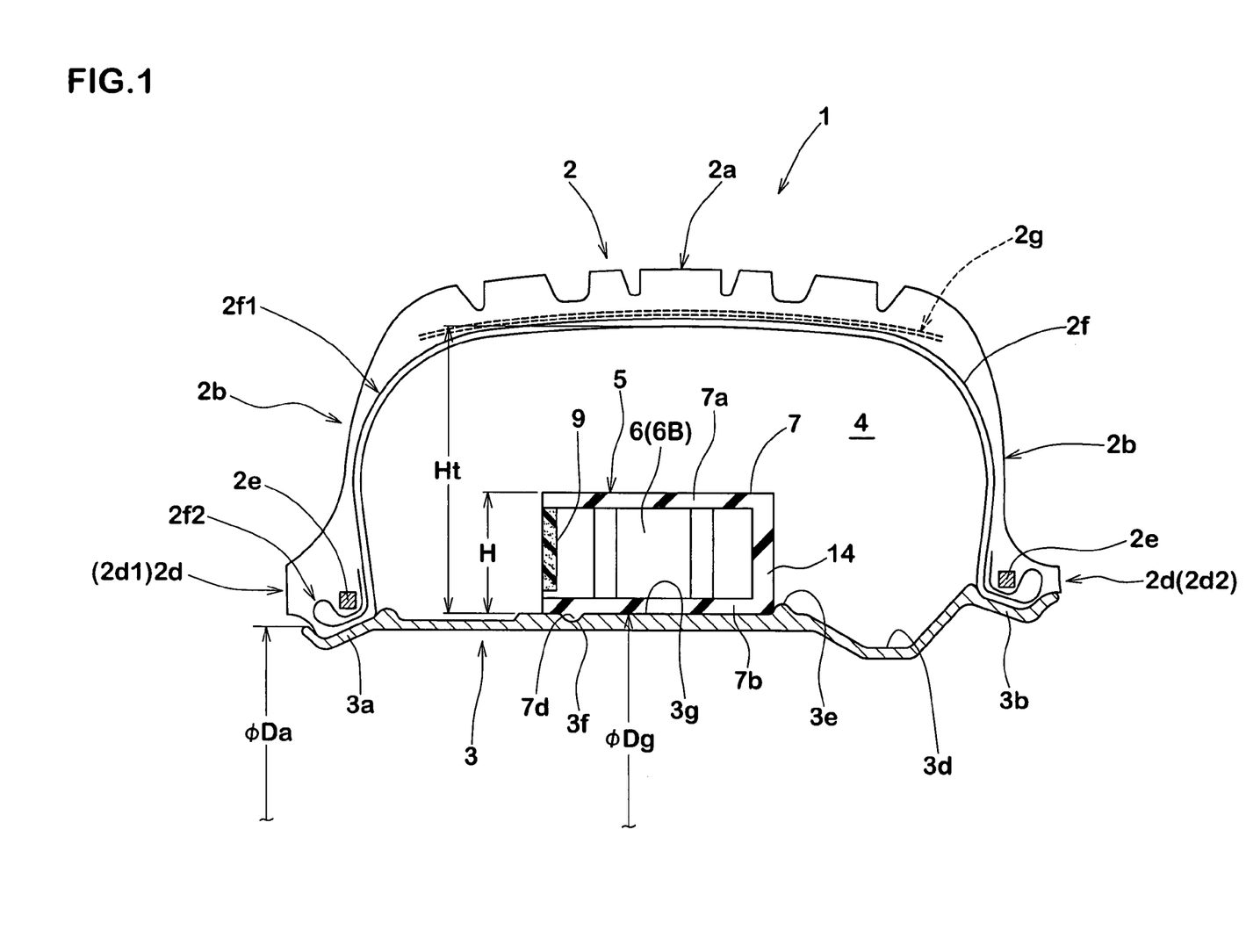
FIG. 1 is a sectional view showing a runflat system in accordance with the present invention.

In the drawing, a runflat tire system 1 according to the present invention comprises a pneumatic tire 2, a wheel rim 3 on which the tire is mounted and a support ring 5 disposed in a cavity 4 surrounded by an inner surface of the rim 3 and an inner surface of the tire 2 mounted thereon.

The pneumatic tire 2 comprises: a tread portion 2a; a pair of axially spaced bead portions 2d each with a bead core 2e therein; a pair of sidewall portions 2b; a carcass 2f extending between the bead portions 2d through the tread portion 2a and sidewall portions 2*b*; and a belt 2*g* disposed radially outside the carcass 2*f* in the tread portion 2*a*.

The bead portions 2*d* also include a first bead portion 2*d*1, and a second bead portion 2*d*2 with an inside diameter larger than the first bead portion 2*d*1.

In order to use the tire 2 without a tire tube, the inner surface of the tire 2 is covered with air-impermeable rubber which is provided as so called inner liner.

The carcass 2*f* comprises a radial ply of cords. The ply includes: a main portion 2*f*1 extending between the bead portions 2*d* through the tread portion 2*a* and the sidewall portions 2*b*; and a pair of turnback portions 2*f*2 each extending from an end of the main portion 2*f*1. The turnback portion 2*f*2 extends from the main portion 2*f*1 to the axially outside of the bead core tire through the radially inside of the bead core 2*e*, and then it is turned back toward the bead core 2*e* so as to form a loop filled with rubber in the axially outside of the bead core 2*e*. Also, the turned back portion 2*f*2 extends between the bead core 2*e* and the main portion, and then it terminates in the bead portion 2*d* 2*f*1. Therefore, when the tension is applied to the main portion 2*f*1, the loop of the turnback portion 2*f*2 is pulled axially inwards. AS the loop has rubber therein, it functions as a wedge driven into the narrow space between the bead core 2*e* and bead seat (3*a* or 3*b*). Thus, the bead portions 2*d* of the tire 2 are firmly locked on the wheel rim 3.

The wheel rim 3 comprises: a first bead seat 3*a* for the first bead portion 2*d*1; a second bead seat 3*b* for the second bead portion 2*d*2 with an outside diameter larger than the first bead seat 3*a*; a rim well 3*d* provided near to the second bead seat 3*b* which is used when mounting the tire; a mounting portion 3*g* for the support ring 5 provided between the rim well 3*d* and the first bead seat 3*a*; a hump 3*e* formed along the axial edge of the mounting portion 3*g* on the rim well side; and a groove 3*f* provided in the mounting portion 3*g* near the other axial edge of the mounting portion 3*g*.

The first and second bead seats 3*a* and 3*b* are tapered axially outwards contrary to the conventional wheel rims whose bead seats are tapered towards the axial center (tire equator).

The outside diameter Dg of the mounting portion 3*g* is larger than the outside diameter Da of a rim flange of the first bead seat 3*a* such that the support ring 5 can be inserted on the mounting portion 3*g*.

The hump 3*e* extends continuously in the circumferential direction so as to function as a stopper for preventing the axial displacement of the support ring 5 towards the rim well as well as positioning the support ring 5.

Figure 2:
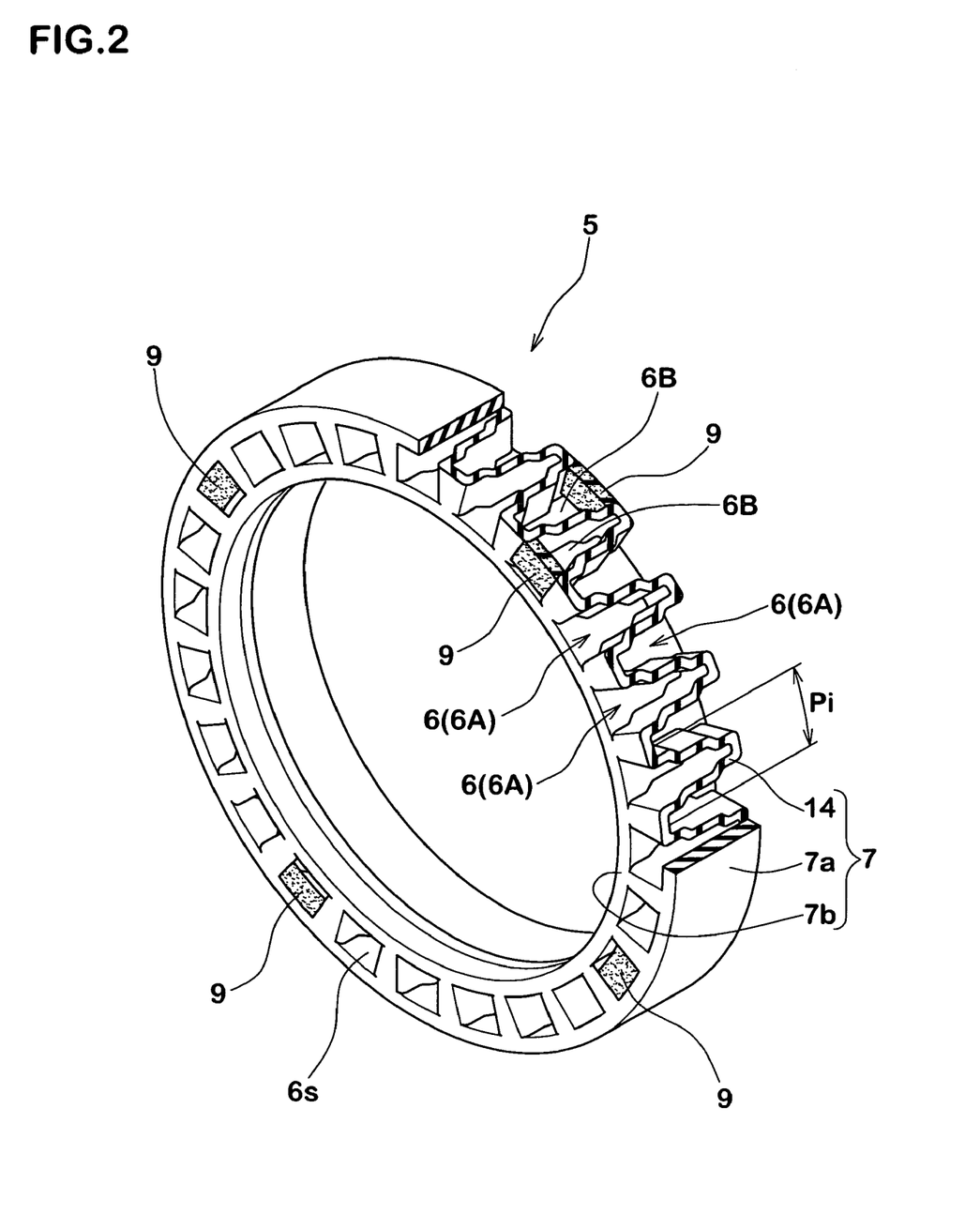
FIG. 2 is a perspective view showing a support ring of FIG. 1.

The support ring 5 comprises an annular body 7 made of an elastic material and at least two sound reflectors 9. This support ring 5 supports the tread portion 2*a* from that inner side so as to enable traveling for a long distance when the tire goes flat.

It is preferable for the durability that the elastic material, such as rubber material, has a hardness of from 45 to 60 degrees and a loss tangent (tan delta) of from 0.02 to 0.08. Here, the hardness means the durometer type-D hardness measured according to Japanese Industrial Standard JIS-K6253 at a temperature of 23+2 degrees C. The loss tangent is measured with a viscoelastic spectrometer under the following conditions: frequency of 10 HZ; temperature of 70 degrees Celsius; and dynamic strain amplitude of 1%.

For example, polyurethane, polybutadiene, rubber, EPDM and the like can be used as the elastic material. In this embodiment, the support ring S is formed as a casting of polyurethane rubber.

The annular body 7 comprises: a radially outer annular portion 7*a* coming into contact with the inside of the tread portion 2*a* when the tire goes flat; a radially inner annular portion 7*b* secured to the wheel rim 3; and a supporting wall portion 14 bridging between the inner and outer annular portions 7*a* and 7*b*, while circumferentially extending in a zigzag manner in this embodiment.

The radially inner surface of the inner annular portion 7*b* is provided with a protrusion 7*d* which fits to the groove 3*f* of the wheel rim 3. Excepting the protrusion 7*d*, the radially inner surface has an inside diameter of which value is constant and slightly smaller than the outside diameter Dg of the mounting portion 3*g* of the wheel rim 3. In other words, the inside diameter of the support ring 5 is slightly smaller than the outside diameter Dg of the mounting portion 3*g* of the wheel rim 3. Thus, when mounted, the support ring 5 can fit tightly to the mounting portion 3*g* due to the elastic deformation thereof.

As shown in FIG. 1, a radial height H of the support ring 5 is set in the range of from 35 to 65% of the radial height Ht of the tire cavity, more preferably in the range of from 40 to 58%, and further preferably in the range of from 40 to 50%. If the radial height H of the support ring 5 is too large, the support ring 5 is very liable to contact with the inside of tread portion 2*a* during normal running, and not only ride comfort but also steering stability and the like are deteriorated. If the radial height H is too small, under runflat mode, a flexure of the tire becomes large and worsens driving stability and runflat distance.

Here, the heights H and Ht are defined as follows under a standard condition that the support ring 5 and the tire 2 are mounted on the wheel rim 3 and the tire is inflated to a standard pressure but loaded with no tire load: the radial height H of the support ring 5 is measured in the radial direction from the mounting portion 3*g* to the radial outmost point of the support ring 5; and the radial height Ht of the tire cavity is measured in the radial direction from the mounting portion 3*g* to the radially outmost point on the inner surface of the tread portion 2*a*. The standard pressure is defined as the "maximum air pressure" in JATMA, the "Inflation Pressure" in ETRTO, and the maximum pressure given in the "Tire Load Limits at various Cold Inflation Pressures" table in TRA or the like. In case of passenger car tires, however, 180 kPa is used as the standard pressure.

Figure 4:
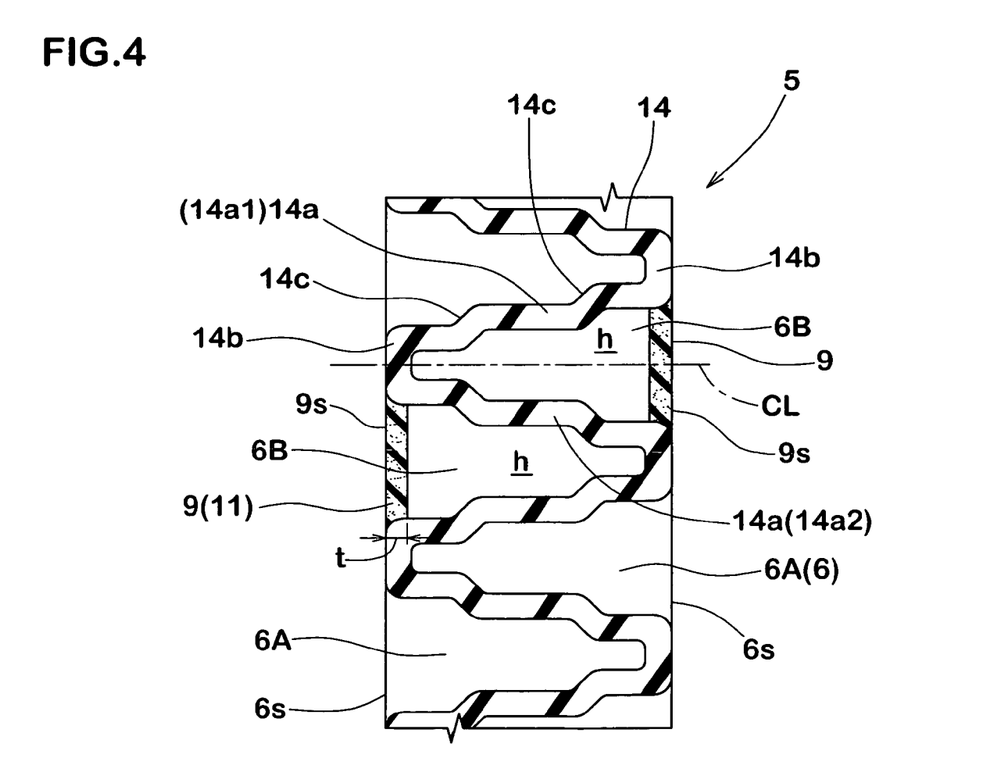
FIG. 4 is a development view taken along line A-A in FIG. 3.
Figure 5A:
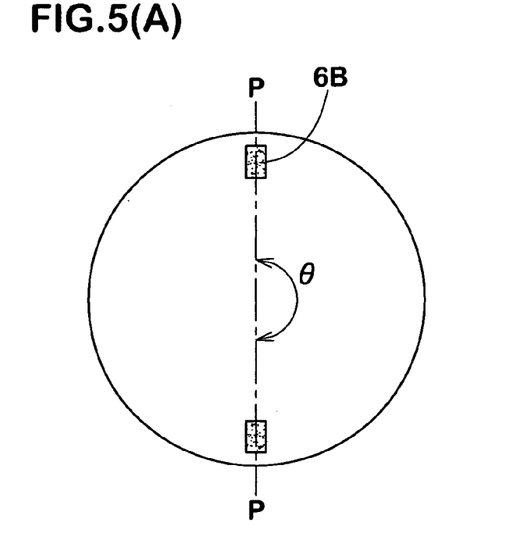
FIGS. 5(A) to 5(D) are side views each showing an arrangement of sound reflectors in the support ring.
Figure 5B:
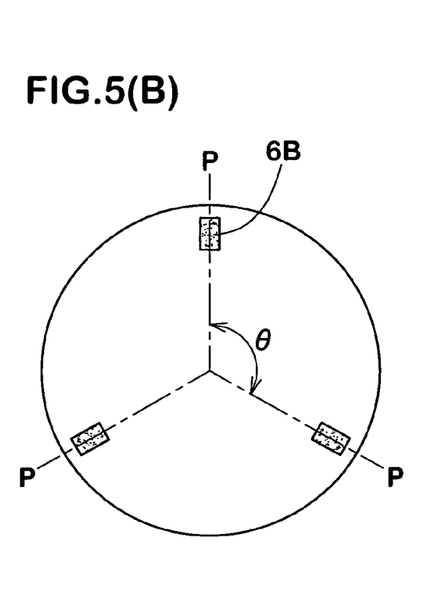
Figure 5C:
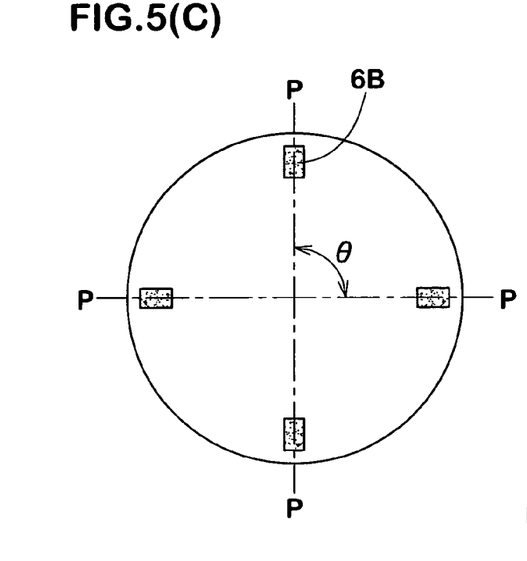
Figure 5D:
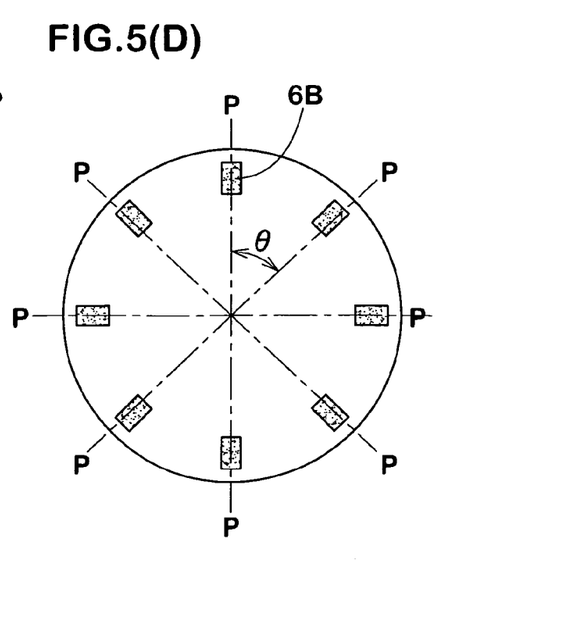

In this embodiment, as shown in FIG. 4, the supporting wall portion 14 comprises two kind of inclined portions 14*a*1 and 14*a*2 each extending in the axial direction of the tire, and connecting portions 14*b* each connecting circumferentially adjacent inclined portions 14*a*1 and 14*a*2 to each other at ends in the axial direction of the tire. The inclined portion 14*a*1 and/or 14*a*2 preferably includes at least one, more preferably two steps 14*c* such that the inclined portion extends in stages in the axial direction of the tire.

The annular body 7 is provided with a plurality of recesses 6 which open at the cavity 4. Each recess 6 is defined by the outer annular portion 7*a*, the inner annular portion 7*b* and the supporting wall portion 14, on the side in the axial direction of the tire. As shown in FIG. 2 or 4, one of the recesses 6 is surrounded by the outer annular portion 7*a*, the inner annular portion 7*b*, a pair of inclining portions 14*a*1 and 14*a*2, and one of the connecting portions 14*b* in this present embodiment.

Further, the recesses 6 are provided such that the recesses 6 alternately open on both sides in the axial direction of the tire and continuously in the circumferential direction of the tire periodically. Since the recesses 6 are disposed on axially both sides of the tire and alternately while keeping balance, the balance of weight of the annular body 7 is equalized, and vibration is prevented from generating at the time of high speed running.

The number of recesses 6 and a volume of one recess 6 are appropriately determined such that the annular body 7 can sufficiently support a load in the runflat state. A preferable total volume of the recesses 6 is in a range of from 20 to 50% of an apparent volume of the annular body 7 for example. The apparent volume of the annular body 7 is the sum total volume of all of the recesses 6 and the annular body 7. Such annular body 7 largely reduces the weight of the support ring 5 and enhances the running performance.

As shown in FIG. 4, an area of the recess 6 intersecting with a direction of the depth is reduced from an inlet $6s$ thereof toward the bottom. In this example, the width of the recess 6 in the circumferential direction is narrowed step wisely or in stages by the step portions $14c$ of the supporting wall portion 14.

As shown in FIG. 2, in the support ring 5, at least two of the recesses 6 arranged in the circumferential direction of the tire are each closed with a sound reflector 9. In this embodiment, the recesses 6 of the annular base body 7 includes a plurality of open recesses 6A whose openings each are opened into the cavity 4, and a plurality of closed recesses 6B whose openings each are closed with the sound reflector 9. In this embodiment, each of both sides of the annular base body 7 in the axial direction of the tire is provided with the open recesses 6A and the closed recesses 6B.

In this embodiment, the sound reflector 9 is made of non-porous material. For example, porous material with continuous and/or independent bubbles has high sound absorbing ability and high vibration isolating ability. Therefore, reflection coefficient (Ir/Ii) of sound which is a ratio of energy "Ii" of incident sound and energy "Ir" of reflected sound is small, and sound in the cavity 4 cannot sufficiently be reflected. In the case of the non-porous material with no bubbles, the reflection coefficient of sound is great. Thus, in the case of the sound reflector 9 made of non-porous material, if at least a portion of its outer surface $9s$ facing the cavity 4, preferably the entire outer surface is formed as a reflection surface $9s$ which can reflect the sound effectively, the reflection coefficient of sound can further be increased.

The reflection surface $9s$ can easily be obtained by smoothening the surface of the non-porous material. Preferably, the sound absorbing rate alpha of frequency 125 to 500 HZ is not more than 1% at the reflection surface $9s$. The sound absorbing rate alpha is a value of vertical incident sound absorbing rate which is measured in accordance with (Acoustics—Determination of sound absorption coefficient and impedance in impedance tubes—Method using standing wave ratio) of JIS A 1405.

Resilient material or plastic material is used as the non-porous material for example. More specifically, suitable materials are rubber, plastic, paper, metal and the like. When the sound reflector 9 is made of resilient material such as rubber for example, the sound reflector 9 can resiliently deform together with the annular base body 7 at the time of run flat running. Therefore, the run flat performance is not deteriorated. When the sound reflector 9 is made of plastic material, the sound reflector 9 is plastically deformed when it initially comes into contact with the ground at the time of the run flat running. With this, the run flat performance is not deteriorated also in the sound reflector 9 made of plastic material. To effective maintain the riding comfort and steering stability, it is preferable that the sound reflector 9 is made of resilient material, especially the same resilient material as that of the annular base body 7.

It is preferable that the sound reflector 9 is fitted into the opening of the recess 6, and is formed as a plate body 11 which closes this opening. With this, a support ring 5 with small weight is provided. The thickness t of the plate body 11 is preferably about from 1 to 10 mm, and more preferably smaller than the thickness of the supporting wall 14 of the annular base body 7. With this, it is possible to prevent the resiliency and the rigidity of the annular base body 7 from being affected.

Figure 3:
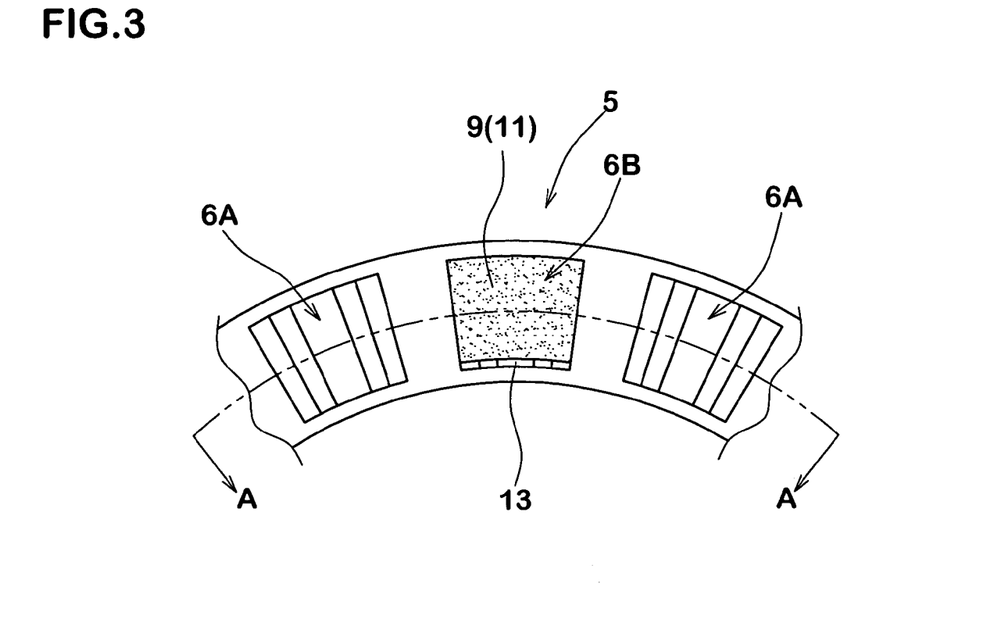
FIG. 3 is a partial side view of the support ring.

A space h (shown in FIG. 4) closed with the sound reflector 9 is formed in the closed recess 6B. The volume of the space h is preferably set not less than 80% of the volume of the recess 6 before it is closed, and more preferably not less than 90%. The space h may substantially be sealed, but as shown in FIG. 3, it is possible that the space h is in communication with the cavity 4 through a small vent port 13. With this, pressure and/or temperature differences between the space h and the cavity 4 are reduced.

The sound reflector 9 is integrally attached to the annular base body 7 using fixing means such as adhesive, double-faced tape and vulcanization adhesive. It is preferable that the reflection surface $9s$ of the sound reflector 9 is mounted such that the reflection surface $9s$ does not protrude from the side surface of the annular base body 7 toward the cavity 4 so that the sound reflector 9 does not wipe off lubricant applied to the inner surface of the tire 2. It is especially preferable that the reflection surface $9s$ is located on the inner side within a range of 10 mm from the side surface of the annular base body 7.

Figure 7:
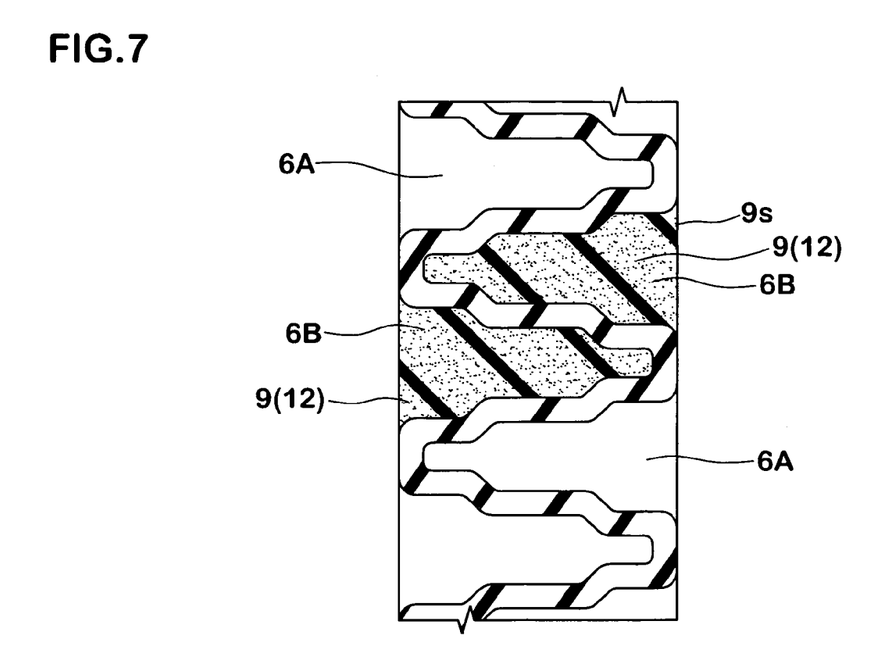
FIG. 7 is a development view taken along line A-A in FIG. 3 showing another embodiment of the support ring.

The sound reflector 9 may be formed of a block body 12 having a volume of from 20 to 100% of that of the recess 6. FIG. 7 shows the sound reflector 9 formed of the block body 12 having the volume of 100% of that of the recess 6.

When resonance is generated in the cavity 4, air vibration reflected by the reflection surface $9s$ of the sound reflector 9 interferes in the standingwave. This reduces the sound pressure of the standingwave, especially peak sound pressure, and road noise.

To further reduce the road noise, it is preferable that the number "n1" of the closed recesses 6B in each side of the annular base body 7 is not more than 40% of the total number "n0" of the recesses 6 in each side surface. To enhance the productivity and to reduce the weight of the support ring 5, it is preferable that the number "n1" of the closed recesses 6B is from 2 to 8, and more preferably from 2 to 6.

To equalize the weight balance of the support ring 5, the closed recesses 6B are preferably arranged regularly in the circumferential direction of the tire so that each interval therebetween is substantially the same. For example, as shown in FIGS. 5(A) to (D), the closed recesses 6B are arranged at locations P separated away from one another at equal center angles theta around a tire axis of 180 deg., 120 deg., 90 deg., 45 deg. or the like.

Figure 6A:
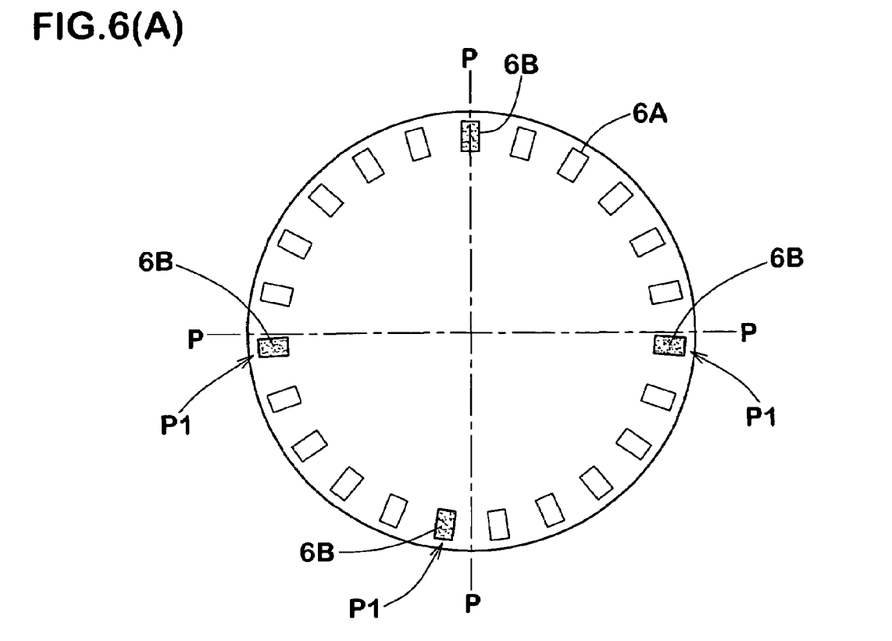
FIGS. 6(A) and 6(B) side views each showing an arrangement of sound reflectors in the support ring.
Figure 6B:
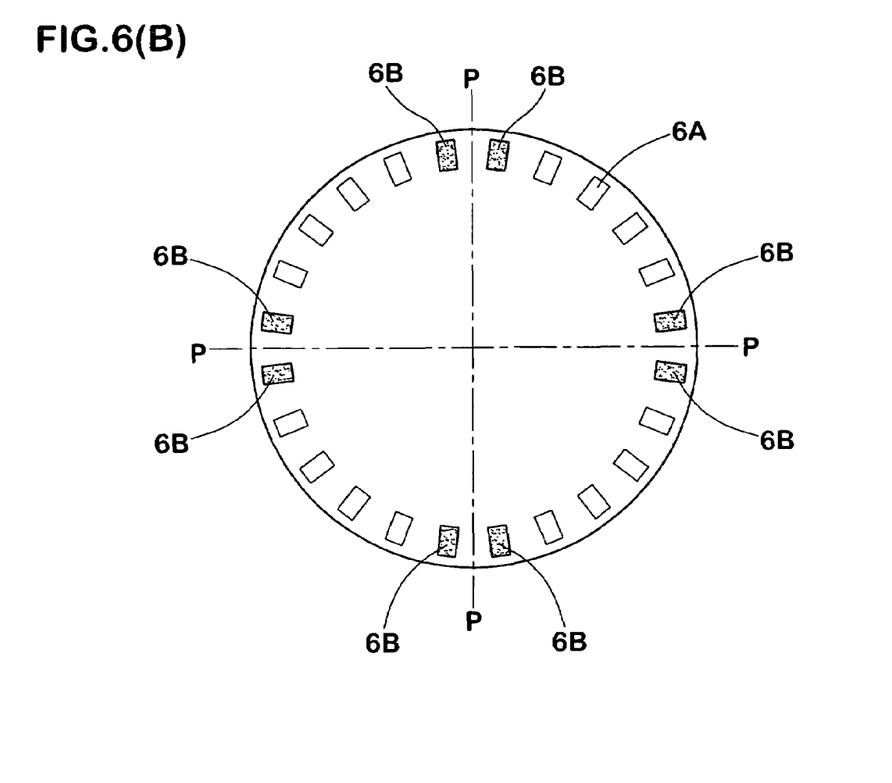

On the other hand, there is a case that the recesses 6 are not provided at the locations P at a precisely equal angle from one another as shown in FIG. 6(A) for example. In such a case, if a closed recess 6B is located at a location P1 which is closest to the precise location P, the interval is regarded as the same. Further, as shown in FIG. 6(B), a plurality of (preferably two) closed recesses 6B may be arranged at positions with the locations P at the equal angle from one another as a reference point. Such an arrangement enhances the reducing effect and uniformity of sound pressure. When the annular base body 7 is formed at its opposite sides with the recesses 6 as shown in FIG. 2, the phases of arrangement of the closed recesses 6B may substantially the same or may be different in the one of the side and the other side. To reduce the road noise and to enhance the uniformity, the phases of the closed recesses 6B are preferably deviated through substantially ½ angle of the center angle theta on the sides. Since the supporting wall 14 has a zigzag shape, the recess 6 in the one side and the recess 6 in the other side are deviated in position in the circumferential direction of the tire by ½ of a pitch pi of the zigzag shape. Therefore, error corresponding to this positional deviation amount (pi/2) is at least allowed.

Figure 8:
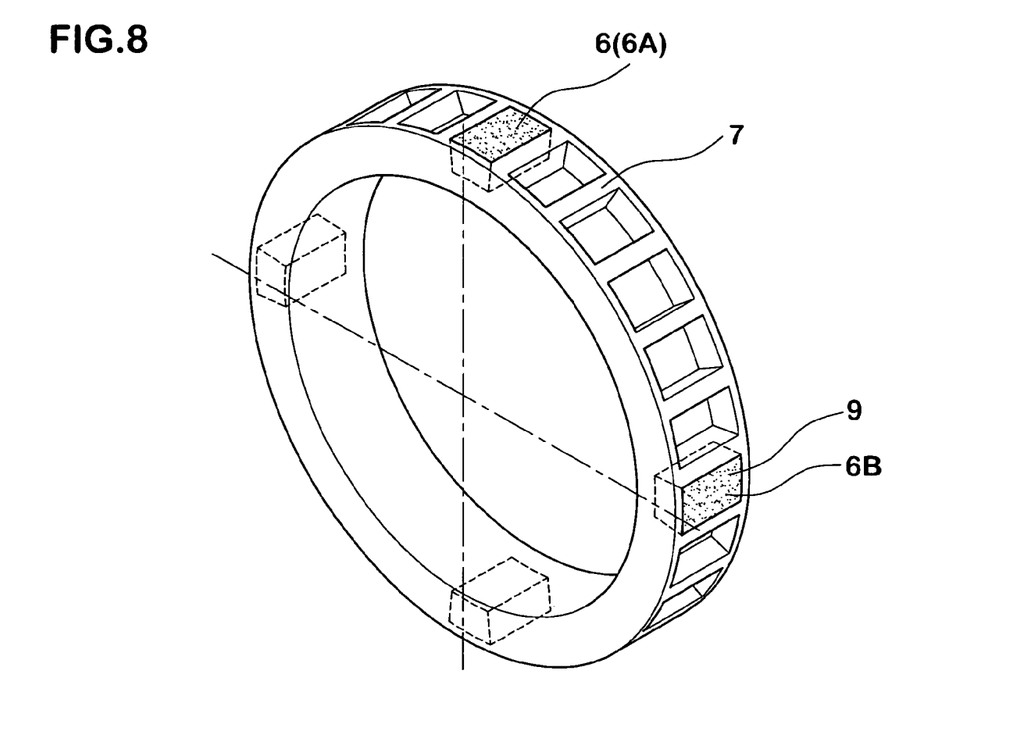
FIG. 8 is a perspective view showing another embodiment of the support ring.

As shown in FIG. 8, the annular base body 7 may be provided at its radially outer peripheral surface with the recesses 6. The sound reflector 9 is mounted on each of at least two recesses 6, and in this embodiment, four recesses 6 at the equal angle 90° from one another.

It is preferable that the shape of the inlet 6s of the recess 6 is rectangular for securing strength, but the shape may be of circular or triangular if necessary. The recess 6 may be a through hole without bottom.

Although the preferable embodiment of the present invention has been explained in detail, the invention is not limited to the illustrated embodiment, and the invention can variously be deformed and may be carried out.

Comparison Test

Runflat systems were prototyped using support rings and sound reflectors having structures shown in FIG. 1. Tires of 225-680R460A were used, and wheel rims of 225×460A were used. A replica reaction force test was carried out for each system.

Figure 9:
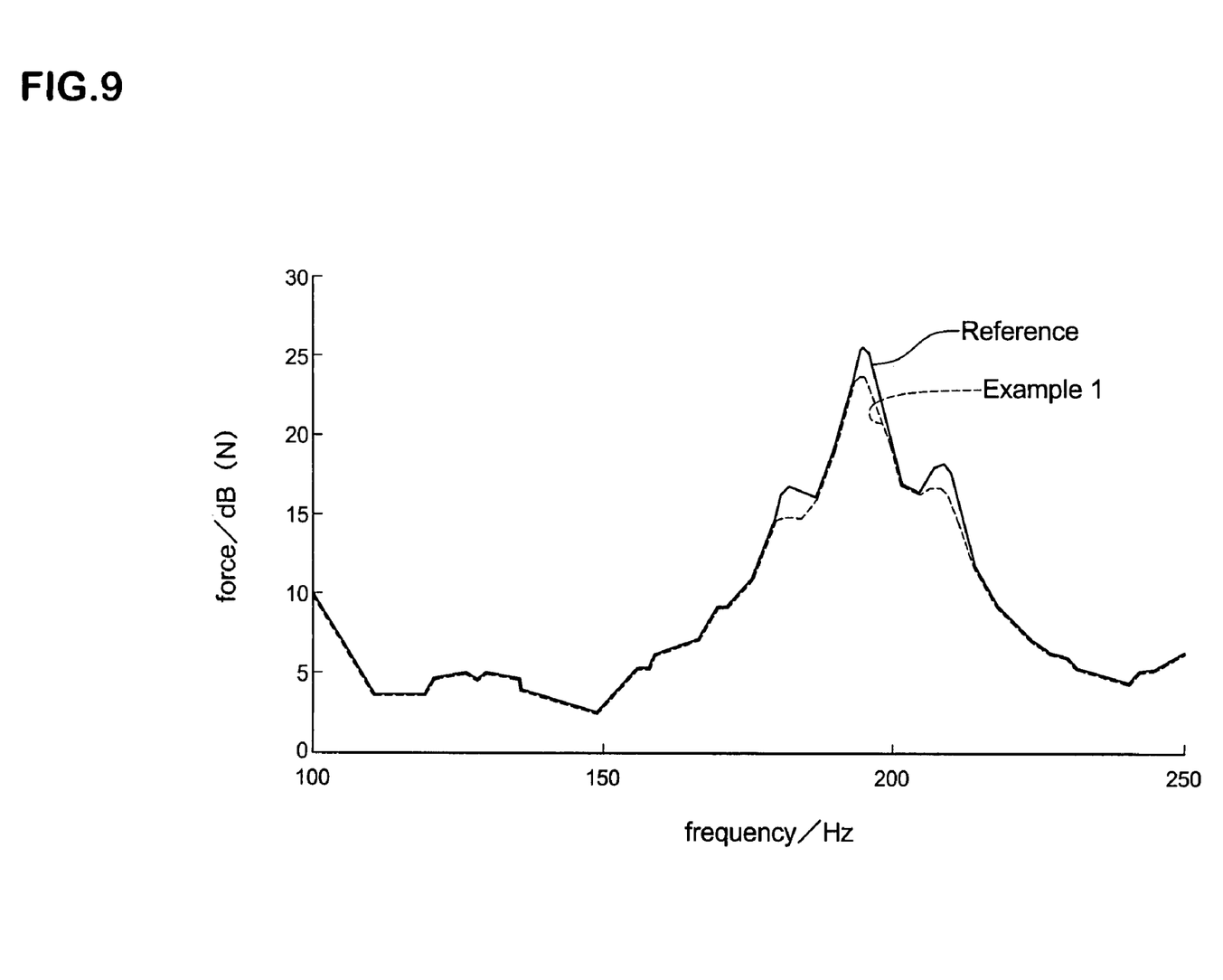
FIG. 9 is a graph showing a result of frequency analysis of a variation in an axial force in the vertical direction in a drum running test of the system.

The replica reaction force test was carried out in such a manner that each system was allowed to run on a drum under the following conditions: internal pressure of 200 kPa, load of 5.1 kN, and speed of 60 km/hr, variation of axial force in the vertical direction at that time was measured and frequency was analyzed. FIG. 9 shows results of frequency analysis of an example 1 of the present invention and a reference. From the frequency analysis, a peak value of axial force variation was obtained, and the value is shown in Table 1 as an evaluation value of running road noise. It has been confirmed that the peak value of the axial force variation correlate with a road noise measurement result of an actual vehicle. The results of the test and the like are shown in Table 1.

TABLE 1

| Annular base body | Reference | Example 1 | Example 2 | Example 3 | Example 4 | Example 5 |
|---|---|---|---|---|---|---|
| Material | Polyurethane | Polyurethane | Polyurethane | Polyurethane | Polyurethane | Polyurethane |
| Size | 80-460(45) | 80-460(45) | 80-460(45) | 80-460(45) | 80-460(45) | 80-460(45) |
| Size of inlet surface of recess (mm) | 37 × 37 | 37 × 37 | 37 × 37 | 37 × 37 | 37 × 37 | 37 × 37 |
| Number of formed recesses (one side) | 26 | 26 | 26 | 26 | 26 | 26 |
| Sound reflector | Absence | Presence | Presence | Presence | Presence | Presence |
| Material | — | Natural rubber | Natural rubber | Polypropylene | Polypropylene | Silicon rubber |
| Sound absorbing rate alpha (%) | — | <<1 | <<1 | <<1 | <<1 | <<1 |
| Thickness t (mm) | — | 5 | 5 | 1.5 | 1.5 | *1 |
| Number of closed recesses (one side) | 0 | 2 | 4 | 4 | 8 | 2 |
| Disposed location (center angle theta) | — | 2 180° | 4 90° | 2 180° | 4 90° | 2 180° |
| Peak value of force variation of vertical axis | 25.1 | 23.3 | 24.1 | 23.1 | 24.3 | 23.4 |

*1 Recess is filled completely

The invention claimed is:

1. A support ring for runflat tire system comprising
an annular body extending in a circumferential direction of the tire and being provided with a plurality of recesses opening at the cavity, and
at least two sound reflectors each being attached to the recess and including an outer surface made of a non-porous material so as to reflect sound in the cavity, the recess being sealed by the sound reflector without communicating with the cavity, and wherein
the sound absorbing rate at the outer surface is not more than 1% for frequencies from 125 to 500 Hz.

2. A runflat tire system comprising
a pneumatic tire,
a wheel rim on which the pneumatic tire is mounted, and
a support ring made of an elastic material and disposed in
a cavity surrounded by an inner surface of the rim and an inner surface of the tire mounted thereon, wherein the support ring comprises
an annular body extending in a circumferential direction of the tire and being provided with a plurality of recesses each opening at the cavity, and
at least two sound reflectors each being attached to the recess and including an outer surface made of a non-porous material so as to reflect sound in the cavity, the recess being sealed by the sound reflector without communicating with the cavity, and wherein
the sound absorbing rate at the outer surface is not more than 1% for frequencies from 125 to 500 Hz.

3. The runflat fire system according to claim 1, wherein the sound reflectors are attached to the recesses regularly in the circumferential direction of the tire so that each interval therebetween is the same.

4. The runflat fire system according to claim 1, wherein
the recesses comprise a plurality of closed recesses whose opening is closed with the sound reflector, and
a plurality of open recesses whose opening is opened into the cavity, and wherein
the number of the closed recesses is not more than 40% of a total number of the recesses in the support ring.

5. The runflat tire system according to claim 1, wherein the sound reflector is attached to the recess such that a space is formed in the recess.

6. The runflat fire system according to claim 1, wherein the sound reflector has a volume in a range of from 20 to 100% of the recess.

7. The runflat tire system according to claim 1, wherein the annular body comprises a radially outer annular portion coming into contact with an inside of a tread portion of the tire when the tire goes flat, a radially inner annular portion secured to the wheel rim and a supporting wall portion bridging between the inner and outer annular portion while circumferentially extending in a zigzag so as to form the recesses which open at opposite sides alternately in the axial direction of the tire.

8. The runflat tire system according to claim 1, wherein the sound reflector has the same volume with the recess.

* * * * *